Patented Dec. 23, 1941

2,267,258

UNITED STATES PATENT OFFICE 2,267,258

DERIVATIVES OF SATURATED AND UNSATURATED COMPOUNDS OF THE CYCLOPENTANOPOLYHYDROPHENANTHRENE SERIES AND PROCESS OF PRODUCING SAME

Leopold Ruzicka, Zurich, Switzerland, assignor, by mesne assignments, to Ciba Pharmaceutical Products, Incorporated, Summit, N. J., a corporation of New Jersey No Drawing. Application August 2, 1938, Serial No. 222,735. In Switzerland August 12, 1937

11 Claims. (Cl. 260—397.4)

According to this invention derivatives of saturated and unsaturated compounds of the cyclopentanopolyhydrophenanthrene series are made by treating compounds of this series containing ethylene linkages in a side chain with agents capable of adding water or acids and if desired re-esterifying and/or hydrolyzing the esters thus formed.

The cyclopentanopolyhydrophenanthrene nucleus contained in the parent materials may be saturated or unsaturated and furthermore may be substituted, for example by substituted or unsubstituted hydroxyl, hydrocarbon, amino or carboxyl groups or by halogen atoms or keto groups or enol derivatives thereof. Accordingly such parent materials may be obtained, for example, from carbonyl compounds of the cyclopentanopolyhydrophenanthrene series such as androsterones, dehydroandrosterones, androstene-dione, dihydrotestosterones, estrone, hexahydro-estrone, equilin, equilenin, pregnenolones, progesterone or enol derivatives or stereoisomers thereof. For this purpose the aforesaid carbonyl compounds may be caused to react, for example, with metal salts of acetylene or of a mono-substituted acetylene, especially in the presence of ammonia and/or an amine, and the acetylene linkage may then be partially hydrogenated and if required any cyclic carbinol groups present may be oxidized. However, the ketones may be condensed with other unsaturated organometallic compounds, for example with vinyl magnesium halides. The ethylene linkages may be present in any desired position of the side chains, for example they may be semicyclic to the nucleus or they may be entirely in the side chain. Several ethylene linkages may also exist in a side chain.

The process of the invention consists in the addition at ethylene linkages in the side chains of water or an acid, for example surfuric acid, a carboxylic acid such as acetic acid, propionic acid or benzoic acid, or a hydrohalogen acid. It may be conducted in manner itself known (see, for example, Houben-Weyl, Methoden der organischen Chemie, 3rd edition, volume 2, pages 974 and 979 and volume 3, page 99) and if desired by the choice of suitable reaction conditions in such a manner that double linkages in the ring structure are not attacked. According to the present process compounds having new free or esterified hydroxyl groups are obtained. The latter groups may be re-esterified and/or hydrolyzed. Thus, for example, halides obtained are converted into carboxylic acid esters preferably by reaction with salts of carboxylic acids, and the carboxylic acid esters are converted by alkaline saponification into the free alcohols which alternatively are also obtainable by direct hydrolysis of the halides. Sulfuric acid esters are generally hydrolyzed even by boiling water. The possibility of converting especially compounds having a hydroxyl and an ethenyl group at the same ring carbon atom into glycols according to the present process is indeed surprising since under the reaction conditions used such compounds otherwise generally undergo rearrangement to form the corresponding primary unsaturated alcohols (allylic rearrangement).

At any desired stage in the course of the process free secondary cyclic carbinol groups may be oxidized to cyclic keto-groups. For causing this oxidation there may be used any of the oxidizing agents known to be suitable for this reaction, for example chromic acid and glacial acetic acid, permanganate or the like. Instead of an actual oxidizing agent there may be used a dehydrogenating agent, for example, a metal or metal oxide of the copper, iron or platinum group, if required under reduced pressure, in presence of an inert gas and/or in combination with a hydrogen acceptor. During the oxidation or dehydrogenation free secondary carbinol groups in the side chain are protected temporarily, for example by esterification or etherification. It is also to be recommended in general that double linkages present, especially in the nucleus, should be temporarily protected during the oxidation. Generally such protection is secured by the addition of halogen or hydrogen halide. After the oxidation the double linkages may be restored by the action of an agent which causes elimination of halogen or halogenhydride. If the double linkage is in $\beta:\gamma$-position to a newly produced keto-group $\beta:\gamma$-unsaturated ketones can be obtained by splitting off the halogen in a neutral solution, for example by the action of zinc dust in an alcohol. These ketones may subsequently be converted into $\alpha:\beta$-unsaturated ketones by the action of an acid or basic agent; such ketones are also obtained directly if the dehydrogenation is conducted in an acid or basic medium. If the secondary cyclic carbinol groups which are to be converted into keto-groups are not present in free form the oxidation or dehydrogenation must be preceded by a saponification, which may be conducted, for example, partially, secondary ester groups in the side chains being preserved.

In the following scheme is illustrated an oxidation of a secondary cyclic carbinol group in the course of the process, taking as an example $\Delta^{5:6}$-17-ethenyl-androstene-diol-(3:17) (I), without, however, limiting the invention to the sequence of reactions shown.

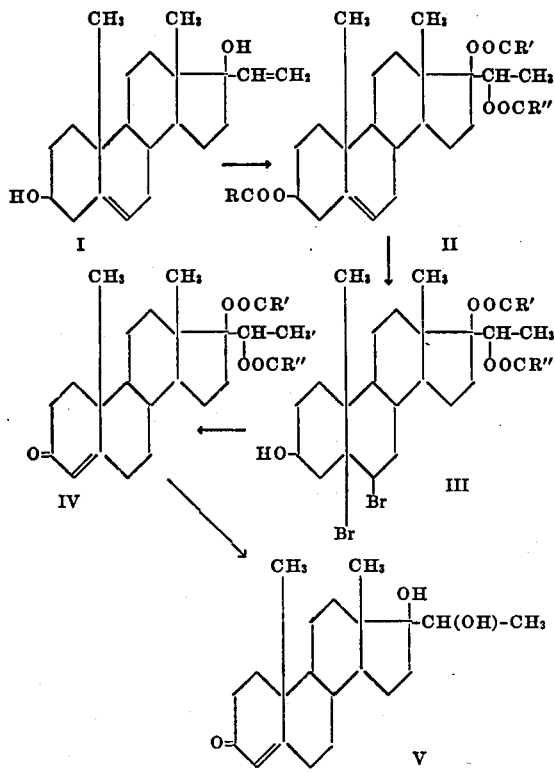

A carboxylic acid, for example, may be added to a diester of the aforesaid diol with formation of a triol triester (II). This triester is partially saponified, an operation which can be conducted smoothly, especially when there is introduced into 20-position an ester group which is less easily saponified than that present in 3-position. Instead of making use of partial saponification the process may start from a diol-17-monoester which is easily obtainable by partial saponification of the corresponding 3:17-diester, or it may start with the free diol. The compound having a free 3-carbinol group obtained in one or other of these ways is brominated for example (III), oxidized, debrominated (IV) and saponified and there is obtained the glycol of the formula V. The sequence of reactions indicated may naturally be exchanged for another analogous sequence. Thus, for example, $\Delta^{5:6}$-17-ethenyl-androstene-diol-(3:17) may first be brominated in 5:6-position, then hydrogen halide may be added at the vinyl group, the 3-carbinol group oxidized to a keto-group, halogen split off and the product subsequently hydrolyzed.

The compounds obtainable in accordance with the invention are useful for therapeutic purposes or as intermediate products for the production of compounds of therapeutic value.

The following examples illustrate the invention, the parts being by weight:

*Example 1*

1 part of 17-ethenyl-testosterone is dissolved at 0° C. in 100 parts of sulfuric acid of 70 per cent strength. The solution is allowed to stand at 0° C. for 24 hours and is then diluted with 400 parts of water and extracted with ether. The ethereal solution is washed with dilute caustic soda solution and with water, dried and evaporated. The residue is a mixture of $\Delta^4$-pregnene-17:20-diol-3-ones which can be separated and purified in the usual manner for example by sublimation, by fractional crystallization and/or by selective adsorption.

If 17-ethenyl-androstane-diol is used instead of 17-ethenyl-testosterone, epi-allo-pregnane-triol-(3:17:20) is obtained in an analogous manner.

*Example 2*

1 part of 17-ethenyl-testosterone is dissolved in 10 parts of ether, dry hydrogen chloride is introduced into the solution until it is saturated and the whole is allowed to stand at room temperature for 2 days. The solvent is then removed in a vacuum and the residue thus obtained is caused to react in absolute alcohol with silver- or alkali-acetate. The silver chloride or sodium chloride thus formed is filtered off and after addition of 5 per cent of potassium hydroxide the filtrate is boiled for 2 hours in a reflux apparatus for hydrolysis. The alcohol in excess is then distilled off in a vacuum, the residue is extracted with ether, washed neutral with dilute sulfuric acid and water and dried over sodium sulfate. $\Delta^4$-pregnene-17:20-diol-3-one is isolated in manner itself known from the yellow oil which is left after evaporating the ether.

*Example 3*

1 part of $\Delta^5$-17-ethenyl-androstene-3:17-diol-diacetate is heated for 2 hours on the waterbath in 10 parts of glacial acetic acid containing 1 per cent of concentrated sulfuric acid. The solution is then strongly concentrated in a vacuum, the $\Delta^5$-pregnene-3:17:20-triol-triacetate thus formed is precipitated with water and filtered by suction. For the purpose of saponification the product is boiled for 30 minutes with 10 parts of methyl alcoholic potash solution of 5 per cent strength, the methyl alcohol is filtered in a vacuum and the reaction product extracted with much ether. After washing with dilute sulfuric acid and water the solution is dried over sodium sulfate and the ether is evaporated. $\Delta^5$-pregnene-3:17-20-triol is obtained from the crystallized residue by recrystallization from methanol.

What I claim is:

1. A process for the manufacture of derivatives of saturated and unsaturated compounds of the cyclopentanopolyhydrophenanthrene series, comprising treating compounds of this series containing ethylene linkages in a side chain in 17-position with agents capable of adding acids and then treating the resultant esters with hydrolyzing agents.

2. A process as claimed in claim 1, wherein the said esters are treated with hydrolyzing agents only after re-esterification.

3. A process for the manufacture of derivatives of saturated and unsaturated compounds of the cyclopentanopolyhydrophenanthrene series, comprising treating compounds of this series containing ethylene linkages in a side chain in 17-position with agents capable of adding acids and then treating the resultant esters with reesterifying agents.

4. A process for the manufacture of derivatives of saturated and unsaturated compounds of the cyclopentanopolyhydrophenanthrene series, comprising treating compounds of this series containing ethylene linkages in a side chain in 17-position with agents capable of adding acids and then treating the resultant esters containing free secondary cyclic carbinol groups with a member of the group consisting of an oxidizing and a dehydrogenating agent.

5. A process for the manufacture of derivatives of saturated and unsaturated compounds of the cyclopentanopolyhydrophenanthrene series, comprising treating compounds of this series containing ethylene linkages in a side chain in 17-position with agents capable of adding acids and then treating the resultant esters containing free secondary cyclic carbinol groups with a member of the group consisting of an oxidizing and a dehydrogenating agent, whereby any double linkages present are temporarily protected.

6. A process for the manufacture of derivatives of saturated and unsaturated compounds of the cyclopentanopolyhydrophenanthrene series, comprising treating compounds of this series containing ethylene linkages in a side chain in 17-position with agents capable of adding acids, treating the resultant esters containing free secondary cyclic carbinol groups with a member of the group consisting of an oxidizing and a dehydrogenating agent, whereby any double linkages present are temporarily protected, and then treating the reaction products with hydrolyzing agents.

7. A process as claimed in claim 6, wherein the said esters are treated with hydrolyzing agents only after re-esterification.

8. Derivatives of saturated and unsaturated compounds of the cyclopentanopolyhydrophenanthrene series, containing a side chain in 17-position of the formula

wherein $x$ stands for halogen and R stands for a hydrocarbon radical.

9. Derivatives of saturated and unsaturated compounds of the cyclopentanapolyhydrophenanthrene series, containing in 17-position of the nucleus the grouping

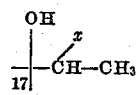

wherein $x$ stands for halogen.

10. The compound of the formula

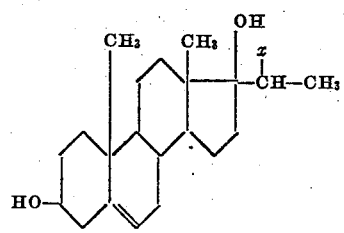

wherein $x$ stands for halogen.

11. The compound of the formula

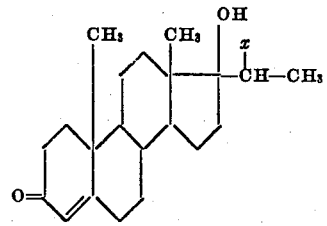

wherein $x$ stands for halogen.

LEOPOLD RUZICKA.